(12) United States Patent
Jones

(10) Patent No.: US 11,675,540 B2
(45) Date of Patent: Jun. 13, 2023

(54) IN-LINE DATA FLOW FOR COMPUTATIONAL STORAGE

(71) Applicant: Seagate Technology LLC, Fremont, CA (US)

(72) Inventor: Marc Timothy Jones, Longmont, CO (US)

(73) Assignee: Seagate Technology LLC, Fremont, CA (US)

(*) Notice: Subject to any disclaimer, the term of this patent is extended or adjusted under 35 U.S.C. 154(b) by 0 days.

(21) Appl. No.: 17/394,709

(22) Filed: Aug. 5, 2021

(65) Prior Publication Data

US 2023/0037870 A1 Feb. 9, 2023

(51) Int. Cl.
*G06F 3/06* (2006.01)

(52) U.S. Cl.
CPC .......... *G06F 3/0659* (2013.01); *G06F 3/0604* (2013.01); *G06F 3/0679* (2013.01)

(58) Field of Classification Search
CPC .... G06F 3/0604; G06F 3/0656; G06F 3/0659; G06F 3/0679
USPC ...................... 710/56, 57; 711/154
See application file for complete search history.

(56) References Cited

U.S. PATENT DOCUMENTS

| | | | | |
|---|---|---|---|---|
| 10,459,644 B2* | 10/2019 | Mehra | ........... | G06F 3/0656 |
| 10,769,059 B2* | 9/2020 | Duran | ........... | G06F 3/0634 |
| 10,860,508 B2* | 12/2020 | Bolkhovitin | ........ | G06F 13/1668 |
| 2019/0042093 A1 | 2/2019 | Adams et al. | | |
| 2020/0201692 A1 | 6/2020 | Kachare et al. | | |
| 2020/0257629 A1 | 8/2020 | Pinto | | |
| 2020/0310694 A1 | 10/2020 | Gao et al. | | |
| 2021/0026763 A1* | 1/2021 | Kim | ........... | G06F 12/1009 |
| 2021/0055975 A1 | 2/2021 | Costa et al. | | |
| 2021/0405918 A1* | 12/2021 | Li | ........... | G06F 12/0246 |
| 2022/0291861 A1* | 9/2022 | Malakapalli | ........ | G06F 3/0679 |

FOREIGN PATENT DOCUMENTS

WO 2020186081 A1 9/2020

OTHER PUBLICATIONS

M. Torabzadehkashi, S. Rezaei, V. Alves and N. Bagherzadeh, "CompStor: An In-storage Computation Platform for Scalable Distributed Processing," 2018 IEEE International Parallel and Distributed Processing Symposium Workshops (IPDPSW), 2018, pp. 1260-1267, doi: 10.1109/IPDPSW.2018.00195. (Year: 2018).*

J. Paul, W. Stechele, M. Kroehnert and T. Asfour, "Improving Efficiency of Embedded Multi-core Platforms with Scratchpad Memories," ARCS 2014; 2014 Workshop Proceedings on Architecture of Computing Systems, 2014, pp. 1-8. (Year: 2014).*

(Continued)

*Primary Examiner* — Reginald G Bragdon
*Assistant Examiner* — Aaron D Ho
(74) *Attorney, Agent, or Firm* — Westman, Champlin & Koehler, P.A.

(57) ABSTRACT

A system includes a storage device and a computational storage processor. The storage device includes media. The computational storage processor is configured to, after issuance of a single command from a host device, receive data corresponding to the command, process the data as the data is received using a filter program and provide results data from the processed data.

17 Claims, 5 Drawing Sheets

(56) References Cited

OTHER PUBLICATIONS

Zhenyuan Ruan, Tong He, and Jason Cong. 2019. INSIDER: designing in-storage computing system for emerging high-performance drive. In Proceedings of the 2019 USENIX Conference on Usenix Annual Technical Conference (Usenix ATC '19). USENIX Association, USA, 379-394. (Year: 2019).*

X. Song, T. Xie and W. Pan, "RISP: A Reconfigurable In-Storage Processing Framework with Energy-Awareness," 2018 18th IEEE/ACM International Symposium on Cluster, Cloud and Grid Computing (CCGRID), Washington, DC, USA, 2018, pp. 193-202, doi: 10.1109/CCGRID.2018.00034. (Year: 2018).*

* cited by examiner

IN-LINE DATA FLOW FOR COMPUTATIONAL STORAGE

SUMMARY

A system includes a storage device having media and a computational storage processor. The computational storage processor is configured to, after issuance of a single command from a host device, receive data corresponding to the command, process the data as the data is received using a filter program and provide results data from the processed data.

A system includes a storage device having media and a computational storage processor configured to, after issuance of a single read-transform command from a host device, receive read data from the media related to the command, continuously process the read data as the read data is received using a filter program and provide results data of the processed read data to the host device over an interface.

A method of in-lining data flow for computational storage includes receiving data that is subject to a single command issued by a host device. The data is processed as the data is received using a filter program and without use of a computational program memory. Results data of the processed data is provided.

This summary is not intended to describe each disclosed embodiment or every implementation of data flow optimization for computational storage as described herein. Many other novel advantages, features, and relationships will become apparent as this description proceeds. The figures and the description that follow more particularly exemplify illustrative embodiments.

DETAILED DESCRIPTION

Figure 1:
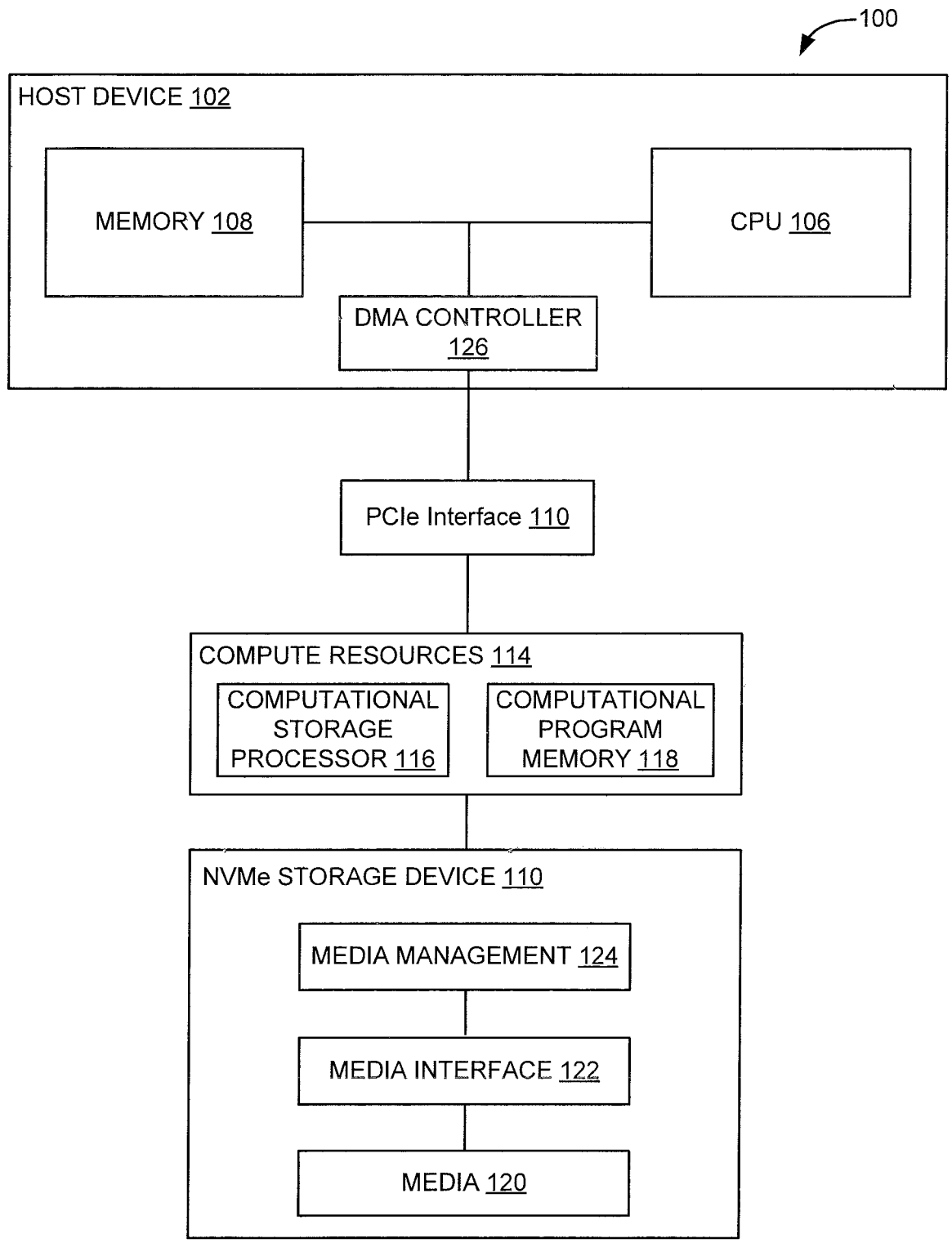
FIG. 1 illustrates a simplified block diagram of an exemplary computational storage computing system in which embodiments of the disclosure may be incorporated.
Figure 2:
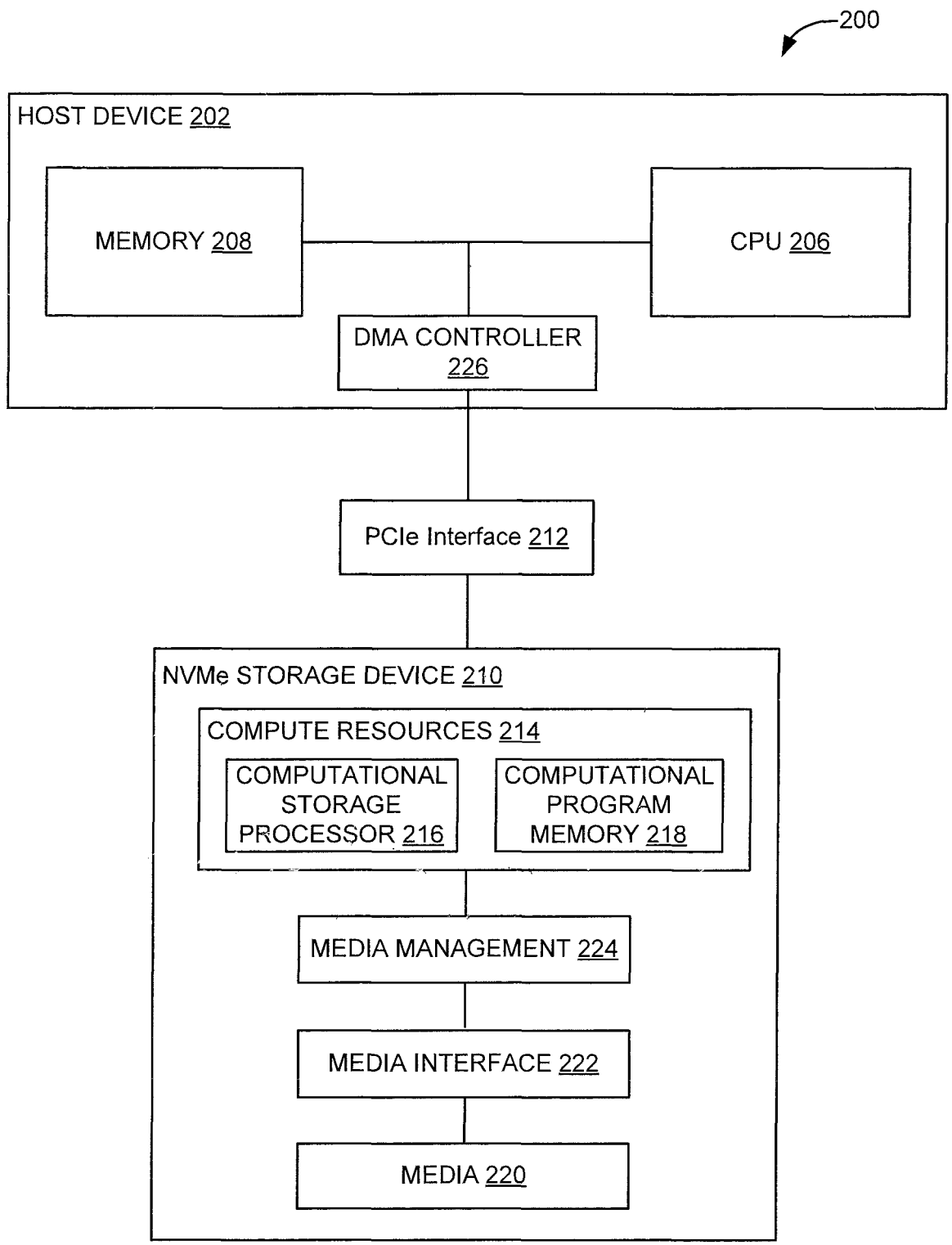
FIG. 2 is a simplified block diagram of another exemplary computational storage computing system in which embodiments of the disclosure may be incorporated.

Embodiments of the disclosure generally relate to in-lining of data flow for computational data storage. FIG. 1 illustrates a simplified block diagram of an exemplary computational storage computing system 100 in which embodiments disclosed herein may be incorporated, and FIG. 2 illustrates a simplified block diagram of another exemplary computational storage computing system 200 in which embodiments disclosed herein may be incorporated. The operating environments shown in FIGS. 1 and 2 are for illustration purposes only. Embodiments of the present disclosure are not limited to any particular environment such as the operating environments shown in FIGS. 1 and 2. Rather, embodiments are illustratively practiced within any number of different types of operating environments.

It should be noted that like reference numerals are used in different figures for same or similar elements. It should also be understood that the terminology used herein is for the purpose of describing embodiments, and the terminology is not intended to be limiting. Unless indicated otherwise, ordinal numbers (e.g., first, second, third, etc.) are used to distinguish or identify different elements or steps in a group of elements or steps, and do not supply a serial or numerical limitation on the elements or steps of the embodiments thereof. For example, "first," "second," and "third" elements or steps need not necessarily appear in that order, and the embodiments thereof need not necessarily be limited to three elements or steps. It should also be understood that, unless indicated otherwise, any labels such as "left," "right," "front," "back," "top," "bottom," "forward," "reverse," "clockwise," "counter clockwise," "up," "down," or other similar terms such as "upper," "lower," "aft," "fore," "vertical," "horizontal," "proximal," "distal," "intermediate" and the like are used for convenience and are not intended to imply, for example, any particular fixed location, orientation, or direction. Instead, such labels are used to reflect, for example, relative location, orientation, or directions. It should also be understood that the singular forms of "a," "an," and "the" include plural references unless the context clearly dictates otherwise.

It will be understood that, when an element is referred to as being "connected," "coupled," or "attached" to another element, it can be directly connected, coupled or attached to the other element, or it can be indirectly connected, coupled, or attached to the other element where intervening or intermediate elements may be present. In contrast, if an element is referred to as being "directly connected," "directly coupled" or "directly attached" to another element, there are no intervening elements present. Drawings illustrating direct connections, couplings or attachments between elements also include embodiments, in which the elements are indirectly connected, coupled or attached to each other.

FIGS. 1 and 2 show computing systems 100 and 200 in which a host device (or host computer) 102, 202 is coupled to a NVMe storage device 110, 210 through either a wired or wireless connection. Host devices 102 and 202 represent any type of computing systems that are configured to read data from and write data to a storage device. Examples of host devices 102 and 202 include cloud computing environments, servers, desktop computers, laptop computers, mobile phones, tablet computers, televisions, automobiles, or any other type of mobile or non-mobile computing device that is configured to read and write data. In general, host device 102, 202 includes a central processing unit (CPU) 106, 206, which is coupled to memory 108, 208.

In one embodiment, computing systems 100 and 200 utilize Non-Volatile Memory Express (NVMe) storage devices 110, 210 connected over a PCIe (Peripheral Component Interconnect Express) interface 112, 212 to enable host software to communicate with the storage devices 110, 210. While NVMe storage devices 110, 210 may include media 120 that is non-volatile memory (NVM) or solid state, NVMe may also support other types of media including a hard drive or spinning platter(s). Computing systems 100 and 200 also integrate compute resources 114, 214, which include computation storage processing 116, 216 and computational program memory 118, 218. In FIG. 1, computing system 100 integrates compute resources 114 between host device 102 and NVMe storage device 110, while in FIG. 2, computing system 200 integrates compute resources 214 directly with NVMe storage device 210.

Computational storage is defined as the general ability to process data that is on a storage device using host-provided programs to offload host processing or reduce data movement. The host-provided programs are stored in the storage device. Prior computational storage computing systems include hosts that send multiple operation commands to compute resources to read computational data. These commands request processing of data over a range of data blocks through the program, which then produces results data. The results data is then made available for read by the host through yet another command. For example, sending multiple operation commands may include host device 102, 202 sending a first command to compute resources 114, 214 to read data from media 120, 220 via media interface 122, 222 and media management 124, 224 into computational program memory 118, 218. Once the read is complete, host device 102, 202 sends a second command to process the data in computational program memory 118, 218 with a program. Once results data are produced and applied back to computational program memory 118, 218, host device 102, 202 sends a third command to read or retrieve the results data stored in computer program memory 118, 218 into memory 108, 208 of host device 102, 202.

Embodiments of the disclosure provide the above functionality, but with host device 102, 202 sending a single command. A single command reduces memory usage and reduces latency of getting data to host device 102, 202 for further processing. In particular, the disclosure applies the pipe-and-filter model to computational storage by in-lining the processing of data with a single read-transform command. Compared to a general read command which returns logical block addresses (LBAs) to be stored on a media, the single read-transform command includes returning LBAs while accessing a filter program to process the data. In other words, embodiments extend an asymmetric or hybrid interface to host device 102, 202, which is implemented to request data and receive a transformed version of the data in return, while traditional symmetric interfaces merely request data and receive the requested data.

The filter program may be a traditional filter, such as a program that excludes and/or modifies data or transforms the data, or transforms the data in some way, such as performing max-pooling on an image in preparation for an image to be processed by a convolutional neural network. Regardless, the single read-transform command instructs computational storage processor 116, 216 to read data stored on media 120, 220 while processing the stream of data being read from media 120, 220 using the filter program. Output results data is automatically sent to host memory 108, 208 using direct memory access (DMA) controller 126, 226. In other words, computational storage processor 116, 216 processes data as part of the read-transform command such that the data is read, streamed and provided by computational storage processor 116, 216 and then automatically managed and sent to memory 108, 208 by DMA controller 126, 226.

In one embodiment, a plurality of filter programs are downloaded from host device 102, 202 into slots in NVMe storage device 110, 210. In this embodiment, the read-transform command not only specifies data to be returned to computational storage processor 116, 216, the read-transform command also specifies a specific program of the plurality of filter programs downloaded from host device 102, 202 to execute on the data. In another embodiment, a plurality of filter programs were previously stored on NVMe storage device 110, 210 as a standard part of storage device 110, 210. As in the former embodiment, the read-transform command specifies a specific program of the plurality of filter programs previously stored on storage device 110, 210 to execute on the data. In yet another embodiment, a read-transform command issued by host device 102, 202 may include the filter program to execute on the data and not require the program to be stored on storage device 110, 210.

PCIe interface 112, 212 supports data stored in packets. Therefore, PCIe interface 112, 212 collects and transfers results data from the stream of data being processed to and from host device 102, 202 in packet size chunks. As packets fill with results data, the memory-paged sized chunks of results data are transferred to DMA controller 126, 226 to be automatically placed in memory 108, 208.

Figure 3:
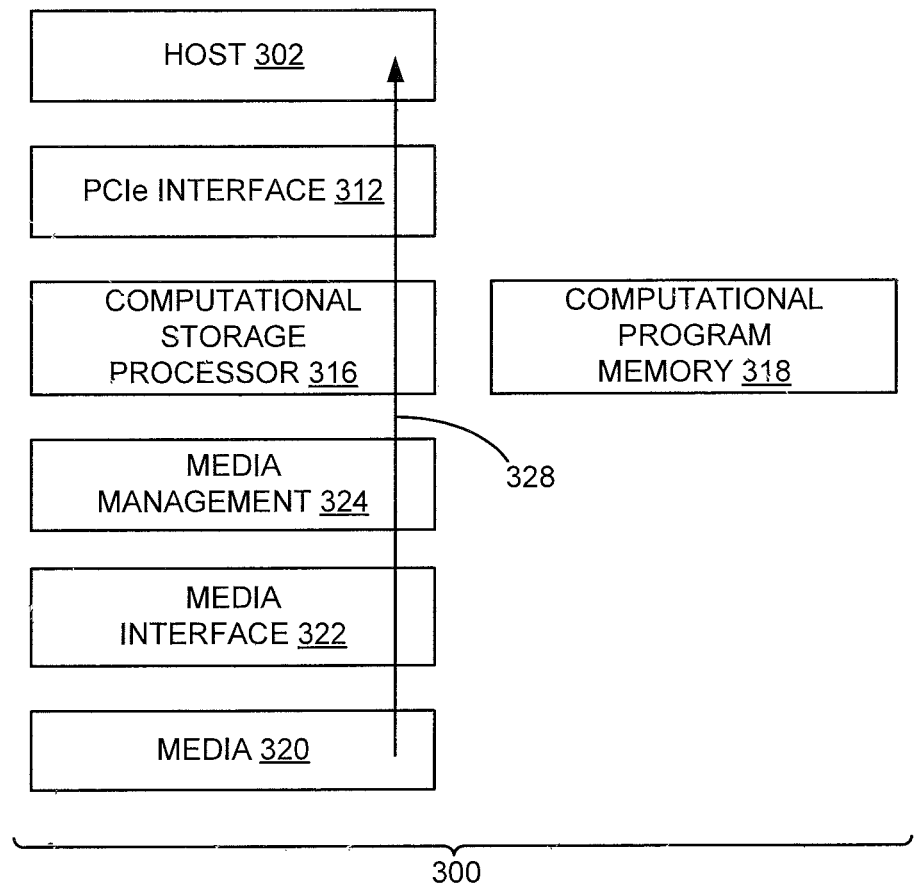
FIG. 3 illustrates a simplified block diagram of in-line data flow for computational storage according to an embodiment.

FIG. 3 illustrates a simplified block diagram 300 of in-line data flow for computational storage by a single read-transform command according to an embodiment. As illustrated by arrow 328, data flows continuously from media 320 through media interface 322 and media management 324 to computational storage processor 316, which transforms or processes the data using a filter program. As data is transformed, the results data flows to PCIe interface 312 where, as previously described, data packets are filled with the results data until the packets are filled and are transferred to host 302. Unlike the discontinuous data flow in prior computational storage computing systems where a first of a set of commands first reads data into computational program memory 318 and holds results data after processing, in FIG. 3, computational program memory 318 remains unused.

With reference back to FIGS. 1 and 2 and as in general read commands, host device 102, 202 sets up to buffer a size of data that corresponds to the size of data to be read or received. For example, in a general read command, host device 102, 202 may want to read four LBAs containing 4,096 bytes each. Therefore, host device 102, 202 will set up to receive and buffer 16,384 bytes of data. Likewise, with the single read-transform command disclosed herein, host 102, 202 allocates memory to buffer a size of data that corresponds to the size of data to be received. Because of the transform portion of the command, host device 102, 202 allocates memory to buffer a size of data that is less than the size of data to be read in the read portion of the command. Host 102, 202 does not know the exact amount of results data that it will receive, so the allocation of memory to buffer is an approximation. For example, in a read-transform command as disclosed herewith, host device 102, 202 may want to read and transform four LBAs containing 4,096 bytes each. Because the 16,384 bytes will be filtered or transformed before being returned to host 102, 202, host device 102, 202 allocates to buffer less than 16,384 bytes of data, such as 4,096 bytes.

Figure 4:
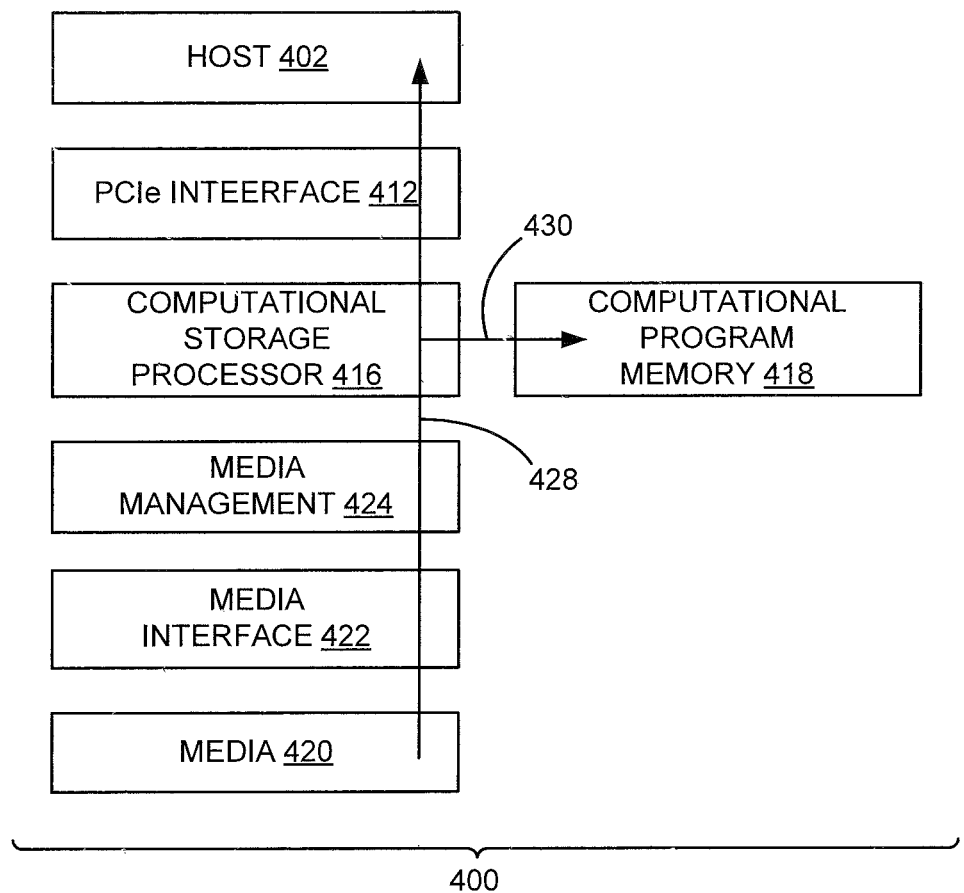
FIG. 4 illustrates a simplified block diagram of in-line data flow for computational storage according to another embodiment.

FIG. 4 illustrates a simplified block diagram 400 of in-line data flow for computational storage by a single read-transform command according to another embodiment. As illustrated by arrow 428, data flows continuously from media 420 through media interface 422 and media management 424 to computational storage processor 416, which transforms or processes the data using a filter program. As data is transformed, the results data flow to PCIe interface 412 where, as previously described, data packets are filled with the results data until the packets are filled and are transferred to host 402. More specifically, PCIe data packets having the results data are transferred into buffer memory, which has been allocated with a set size of memory. If allocated memory to be buffered is exhausted and there are still results data to transfer, the remaining results data are overflowed into computational program memory 418 as illustrated in by arrow 430. The completion of the read-transform command indicates to host 402 that overflow results data exists along with buffer information to retrieve the remaining data from computational program memory 418.

Figure 5:
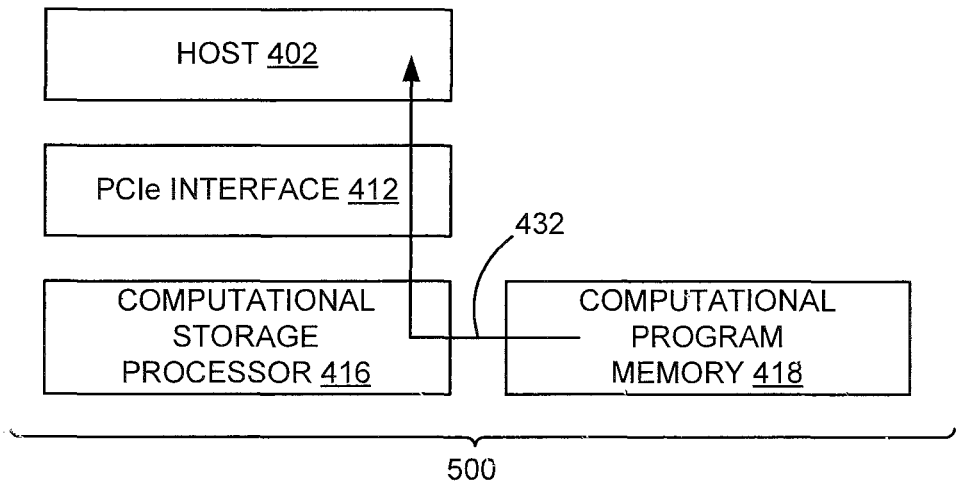
FIG. 5 illustrates a simplified block diagram of the flow of data upon a host issuing a read command to read overflow results data.

FIG. 5 illustrates a simplified block diagram 500 of the flow of data upon host 402 sending a read command to read from computational program memory 418 the overflow of results data (which cannot fit in the host buffer) from the read-transform command illustrated in FIG. 4. As illustrated, the remaining results data flows to PCIe interface 412 where, as previously described, data packets are filled with the remaining results data until the packets are filled and are transferred to host 402. More specifically, PCIe data packets having the results data are transferred into buffer memory, which has been allocated with a set size of memory equal to the amount of overflow results data indicated in the completion of the read-transform command.

Figure 6:
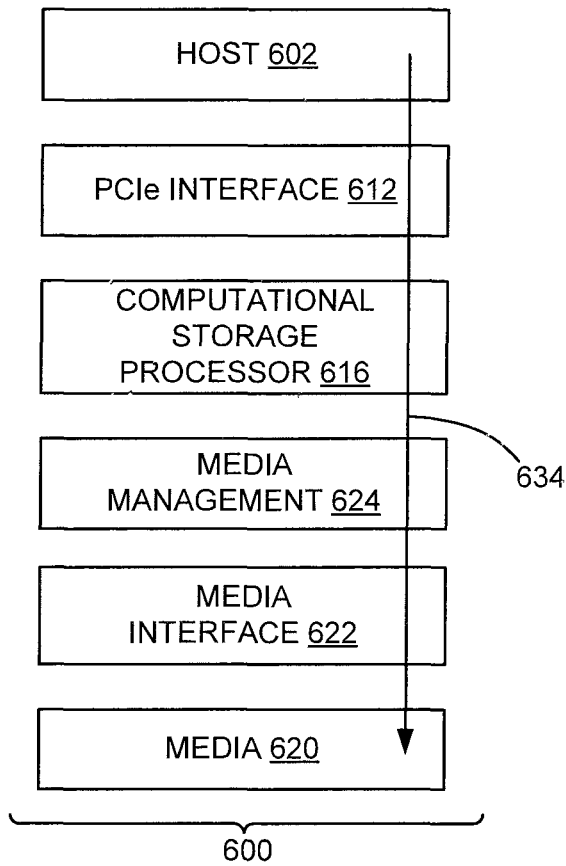
FIG. 6 illustrates a simplified block diagram of in-line data flow for computational storage according in yet another embodiment.

In another embodiment, a write command from host device 102, 202 may be issued as a write-transform command to filter or otherwise modify write data into a new form that is stored on media 120, 220. FIG. 6 illustrates a simplified block diagram 600 of in-line data flow as for a single write-transform command according to an embodiment. As illustrated by arrow 634, data flows continuously from host 602 through PCIe interface 612 to computational storage processor 616, which transforms or processes the write data using a filter program stored in the storage device. In one embodiment, where a plurality of filter programs are downloaded from host 102, 202 into slots in NVMe storage device 110, 210, the write-transform command not only specifies data to be processed by computational storage processor 616, but the write-transform command also specifies a specific program of the plurality of filter programs downloaded from host device 102, 202 to execute on the data. In another embodiment, a plurality of filter programs were previously stored on NVMe storage device 110, 210 as a standard part of storage device 110, 210. As in the former embodiment, the write-transform command specifies a specific program of the plurality of filter programs previously stored on storage device 110, 210 to execute on the data. In yet another embodiment, a write-transform command issued by host 602 may include the filter program to execute on the data and not require the program to be stored on a storage device.

As write data is transformed, the resulting write data flows to media management 624, media interface 622 and media 620. For example, write data may include an audio or video file and computation storage processor 616 changes the bitrate using a specific filter program and transfers the modified write data to media 620. In yet another example, write data may be image data, and after applying a filter program, human faces found in the image are saved in metadata.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually and/or collectively, by the term "invention" merely for convenience and without intending to limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments employ more features than are expressly recited in each claim. Rather, as the following claims reflect, inventive subject matter may be directed to less than all of the features of any of the disclosed embodiments.

The above-disclosed subject matter is to be considered illustrative, and not restrictive, and the appended claims are intended to cover all such modifications, enhancements, and other embodiments, which fall within the true spirit and scope of the present disclosure. Thus, to the extent allowed by law, the scope of the present disclosure is to be determined by the broadest permissible interpretation of the following claims and their equivalents, and shall not be restricted or limited by the foregoing detailed description.

What is claimed is:

1. A system comprising:
a storage device including at least one data storage medium; and
a computational storage processor configured to, after issuance of a single read-transform command from a host device, receive read data from the at least on data storage medium corresponding to the single read-transform command, process the read data using a filter program and provide results data of the processed read data to the host device,
wherein when memory allocated in the host device to buffer the results data directly transferred from the computational storage processor is exhausted, the computational storage processor is configured to overflow any remaining results data to a computational program memory outside the host device.

2. The system of claim 1, wherein the computational program memory is integral with the storage device.

3. The system of claim 1, wherein the system comprises the computational program memory, and wherein the computational program memory is separate from the storage device.

4. The system of claim 1, wherein the system comprises the host device and completion of the read-transform command indicates to the host device existence of the remaining results data overflowed to the computational program memory along with buffer information to retrieve the remaining results data.

5. The system of claim 4, wherein the memory of the host device is allocated to buffer the remaining results data and the host device is configured to issue a read command to read the remaining results data from the computational program memory.

6. The system of claim 1, wherein the filter program comprises one of a plurality of filter programs previously stored on the storage device, one of a plurality of filter programs provided by the host device and stored on the storage device or one of a plurality of filter programs provided as part of the single command issued by the host device.

7. The system of claim 1, wherein the computational storage processor is further configured to, after issuance of a single write-transform command from the host device, receive write data from the host device corresponding to the single write-transform command, process the write data using another filter program and provide results data of the processed write data to the storage device.

8. The system of claim 1, wherein the computational storage processor is separate from the storage device.

9. The system of claim 1, wherein the computational storage processor is integral with the storage device.

10. A system comprising:
   a storage device including media; and
   a computational storage processor configured to, after issuance of a single read-transform command from a host device, receive read data from the media related to the single read-transform command, continuously process the read data as the read data is received using a filter program and provide results data of the processed read data to the host device over an interface,
   wherein when memory allocated in the host device to buffer the results data directly transferred from the computational storage processor is exhausted, the computational storage processor is configured to overflow any remaining results data to a computational program memory outside the host device.

11. The system of claim 10, wherein the computational program memory is integral with the storage device.

12. The system of claim 10, wherein the system comprises the computational program memory, and wherein the computational program memory is separate from the storage device.

13. The system of claim 10, wherein the system comprises the host device and completion of the single read-transform command indicates to the host device existence of the remaining results data overflowed to the computational program memory along with buffer information to retrieve the remaining results data.

14. The system of claim 13, wherein the memory of the host device is allocated to buffer the remaining results data and the host device is configured to issue a read command to read the remaining results data from the computational program memory.

15. The system of claim 10, wherein the filter program comprises one of a plurality of filter programs previously stored on the storage device, one of a plurality of filter programs provided by the host device and stored on the storage device or one of a plurality of filter programs provided as part of the single read-transform command issued by the host device.

16. A method of in-lining data flow for computational storage, the method comprising:
   receiving, by a computational storage processor, read data from media in a storage device that is subject to a single read-transform command issued by a host device;
   processing, by the combinational storage processor, the read data as the read data is received using a filter program to obtain to obtain results data for the read data;
   allocating memory in the host device to buffer the results data;
   directly transferring the results data from the computational storage processor to the allocated memory until the allocated memory is exhausted; and
   when the allocated memory is exhausted, overflowing, by the computational storage processor, any remaining results data to a computational program memory outside the host device.

17. The method of claim 16, and further comprising:
   receiving, by the computational storage processor, write data from the host corresponding to a single write-transform command:
   processing, by the computational storage processor, the write data using another filter program; and
   providing the results data of the processed write data tot e storage device.

* * * * *

UNITED STATES PATENT AND TRADEMARK OFFICE
CERTIFICATE OF CORRECTION

| | |
|---|---|
| PATENT NO. | : 11,675,540 B2 |
| APPLICATION NO. | : 17/394709 |
| DATED | : June 13, 2023 |
| INVENTOR(S) | : Marc Timothy Jones |

It is certified that error appears in the above-identified patent and that said Letters Patent is hereby corrected as shown below:

In the Claims

On Column 6, Claim 1, Line 47, please replace the word "on" with the word --one--.

On Column 8, Claim 16, Line 24, please replace the word "combinational" with the word --computational--.

On Column 8, Claim 16, Line 26, please delete the duplicate words "to obtain".

On Column 8, Claim 17, Lines 43-44, please replace the words "tot e" with the words --to the--.

Signed and Sealed this
Eleventh Day of July, 2023

Katherine Kelly Vidal
*Director of the United States Patent and Trademark Office*